(12) United States Patent
Bouillet et al.

(10) Patent No.: US 7,116,703 B2
(45) Date of Patent: Oct. 3, 2006

(54) MULTIPATH SIGNAL STRENGTH INDICATOR

(75) Inventors: Aaron Reel Bouillet, Noblesville, IN (US); Matthew Thomas Mayer, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 35 days.

(21) Appl. No.: 10/270,764

(22) Filed: Oct. 15, 2002

(65) Prior Publication Data

US 2004/0071241 A1    Apr. 15, 2004

(51) Int. Cl.
 *H04B 1/707* (2006.01)
 *H04B 1/10* (2006.01)
 *H03H 7/30* (2006.01)

(52) U.S. Cl. .................. 375/148; 375/232; 375/346

(58) Field of Classification Search ............... 375/347, 375/229, 231, 232, 233, 348, 341, 144, 142, 375/143, 148, 150, 152, 227, 346; 370/320, 370/335, 342; 455/67.11, 67.13
See application file for complete search history.

(56) References Cited

U.S. PATENT DOCUMENTS

| | | | | |
|---|---|---|---|---|
| 5,490,091 | A | * | 2/1996 | Kogan et al. ............... 702/180 |
| 5,615,233 | A | * | 3/1997 | Baum et al. ................ 375/350 |
| 6,541,950 | B1 | * | 4/2003 | Townsend et al. ....... 324/76.14 |
| 2003/0058962 | A1 | * | 3/2003 | Baldwin ..................... 375/316 |
| 2003/0081659 | A1 | * | 5/2003 | Yousef et al. ............... 375/148 |
| 2005/0069023 | A1 | * | 3/2005 | Bottomley et al. ......... 375/148 |

* cited by examiner

*Primary Examiner*—Young T. Tse
(74) *Attorney, Agent, or Firm*—Joseph J. Laks; Ronald H. Kurdyla; Brian J. Dorini

(57) ABSTRACT

A multipath signal strength indicator is included in a communications receiver which is responsive to a communications channel subject to a multipath signal. The multipath signal strength indicator includes circuitry for estimating the characteristics of the communications channel and circuitry for storing nominal characteristics of a communications channel free of the multipath signal. Further circuitry calculates the difference between the nominal characteristic and the estimated channel characteristic as the multipath signal strength.

17 Claims, 4 Drawing Sheets

MULTIPATH SIGNAL STRENGTH INDICATOR

FIELD OF THE INVENTION

Background of the Invention

The present invention relates to signal strength indicators, and in particular to signal strength indicators which may be used for antenna-pointing purposes, especially in terrestrial broadcast applications in which multipath interference is significant.

Communications receivers often include a form of signal strength indicator. Signal strength indicators produce indications which are a composite of all the signal components received by the receiving antenna. These components include, among others, a direct transmitted signal component, a noise component, and possibly one or more multipath signal components, which are delayed versions of the direct transmitted signal component generated by reflections off of objects. Multipath signals generated by reflections off of fixed objects are called static multipath or ghost signals. Multipath signals generated by reflections off of moving objects are called dynamic multipath or Doppler signals.

Communications receivers normally include equalizers which are used to compensate for multipath signals. These multipath equalizers may be implemented as part of a channel equalizer, which compensates for distortion introduced into the transmitted signal by the communications channel, or may be implemented as a distinct element separate from the channel equalizer. The multipath equalizer is usually implemented as an adaptive FIR filter with the tap coefficients adjusted to minimize detected multipath signals, both static and dynamic, in a known manner. However, one skilled in the art will understand that an adaptive IIR filter or combination FIR/IIR filter, such as typically found in decision feedback equalizer implementations, may also be used.

One skilled in the art will understand that the direct transmitted signal component is obviously directional in nature because it emanates from the transmitting antenna, and that the noise component is in general non-directional in nature. Because the multipath components emanate from reflecting surfaces, they are also directional in nature.

The indications of the signal strength indicator may be used by a user for antenna aiming purposes. In general, the optimum antenna aiming direction is toward the source of the direct transmitted signal component. As described above, the direct transmitted signal component is directional and the noise is not. Thus, in a communications system including primarily the direct transmitted signal component and noise (i.e. the multipath component is relatively small), such as a satellite broadcast system, aiming the antenna in the direction producing the maximum level on the signal strength indicator will normally produce a good result.

However, in a communications system in which the multipath component is significant, such as in a terrestrial broadcast system, the optimum antenna aiming position may not be the direction yielding the maximum level on the signal strength indicator. This is due to the directional nature of the multipath components. That is, a conventional signal strength indicator may produce a maximum level from an antenna direction pointing between the direction of one or more strong multipath components and the direction of the source of the direct transmitted signal component, instead of in the direction of the source of the direct transmitted signal component. In this situation, which is not rare, the signal strength is not able to indicate the optimum antenna pointing direction, and worse will indicate a pointing direction which includes a significant multipath component.

An indicator of the strength of the multipath component alone received at the antenna would enable a user to point the antenna more accurately to a location producing a minimum multipath component, or be used in conjunction with a signal strength indicator to point the antenna in a direction which reduces the multipath component received while increasing the direct transmitted signal component received.

BRIEF SUMMARY OF THE INVENTION

The inventors have realized that the communications channel has a nominal response characteristic in the absence of multipath signals, and that the difference between the current response characteristic of the communications channel and the nominal response characteristic of the communications channel provides a measure of the strength of the multipath signal.

In accordance with principles of the present invention a multipath signal strength indicator is included in a communications receiver which is responsive to a communications channel subject to a multipath signal. The multipath signal strength indicator includes circuitry for estimating the current characteristics of the communications channel and circuitry for storing nominal characteristics of a communications channel free of the multipath signal. Further circuitry calculates the difference between the nominal characteristic and the estimated channel characteristic as the multipath signal strength.

The inventors have also realized that the values of the coefficients for the taps in the adaptive digital filter in the multipath channel equalizer represent the current channel characteristics and, thus, provide a representation of the multipath signal. In accordance with further principles of the present invention, a multipath signal strength indicator is included in a communications receiver which includes a multipath equalizer having an adaptive digital filter including a source of tap coefficients. The multipath signal strength indicator includes a source of nominal coefficient values corresponding to tap coefficients representative of a received signal free of a multipath signal. Further circuitry in the multipath signal strength indicator calculates the combined magnitudes of the respective differences between the values of the nominal coefficients and the corresponding tap coefficients as the multipath signal strength.

By using a multipath signal strength indicator according to principles of the present invention, the user may aim the antenna more accurately to maximize the received direct transmitted signal component while minimizing the received multipath component.

DETAILED DESCRIPTION OF THE INVENTION

Figure 1:
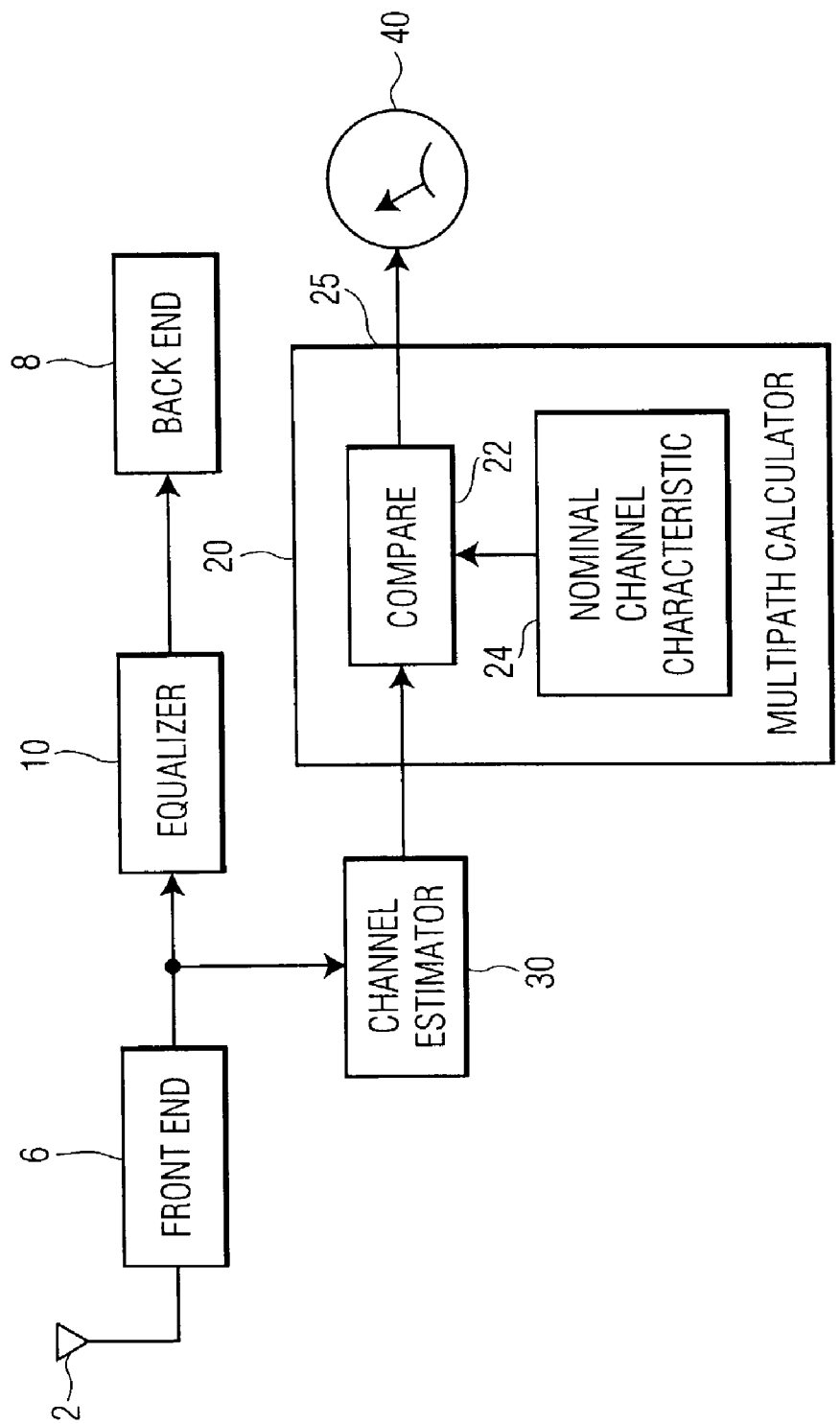
FIG. 1 is a block diagram of a portion of a communications receiver including a multipath signal strength indicator according to principles of the present invention.

FIG. 1 is a block diagram of a portion of a communications receiver including a multipath signal strength indicator according to principles of the present invention. Only those elements necessary to describe and understand the operation of the present invention are illustrated in FIG. 1. One skilled in the art will understand what additional elements are necessary, how to design and implement those elements, and how to interconnect all the elements to make an operating communications receiver. In order to simplify the figure, clock signal lines and control lines are not illustrated. One skilled in the art will understand that these signals are necessary and will understand how to generate them and interconnect them to the circuitry illustrated in FIG. 1.

In FIG. 1, an antenna 2, in particular a directional antenna, is coupled to an input terminal of a receiver front end 6. This front-end 6 may comprise an RF tuner; IF amplifier; demodulator; carrier, symbol and segment timing recovery circuitry; DC recovery circuitry; field synchronization detector; and NTSC co-channel rejection circuitry; (none of which are shown) all of known design. An output terminal of the receiver front end 6 is coupled to respective input terminals of a multipath equalizer 10 and a channel estimator 30. An output terminal of the equalizer 10 is coupled to the receiver back end 8. The receiver back end 8 may include phase tracking loops, inner decoders, de-interleavers, outer decoders, descramblers and other circuitry for processing the received signal, (none of which are shown) all of known design. For example, in a terrestrial broadcast television communications system, this circuitry may include a display screen and associated circuitry for displaying the image represented by the video component and speakers and associated circuitry for reproducing the sound represented by the audio component of the received television signal.

An output terminal of the channel estimator 30 is coupled to a first input terminal of a comparing circuit 22. A source 24 of nominal channel characteristics is coupled to a second input terminal of the comparing circuit 22. The combination of the comparing circuit 22 and the nominal channel characteristic source 24 form a multipath calculator 20. An output terminal of the comparing circuit 22 is coupled to an output terminal 25 of the multipath calculator 20, which, in turn, is coupled to an input terminal of a multipath signal strength indicator 40, represented schematically as an analog meter 40.

In operation, the front end 6, equalizer 10 and back end 8 operate in a known manner to receive a modulated signal transmitted by a transmitter through a communications channel, and to extract, process and utilize the modulating signal. The communications channel is subject to multipath signals, possibly of varying strength, as described above. The channel estimator 30 generates data representing an estimate of the current communications channel characteristic. The current channel characteristic contains information representing the strength of the current multipath signal component in the received signal. The source 24 of nominal channel characteristics contains data representing the characteristic of the communication channel when no multipath component is present. The comparing circuit 22 compares the current communications channel characteristic to the nominal communications channel characteristic. The difference between the current communications channel characteristic and the nominal communications channel characteristic is a measure of the strength of the multipath component in the received signal.

In the illustrated embodiment, the channel estimator 30 operates to generate an estimate of the current impulse response of the channel. Any method for determining the current impulse response of the channel may be used. For example, one skilled in the art will understand that in an HDTV receiver the received signal includes periodically repeated synchronization sequences having fixed known values. These periodic sequences may be used as training sequences. In such a system, the channel estimator 30 includes a correlator which correlates the periodic training sequences in the received HDTV signal with a reference signal sequence having those known fixed values. The result of this correlation is a vector, or sequence, of signal values, representing the current channel impulse response.

In an ideal channel with no multipath, the impulse response represented by such a vector is a single impulse. Therefore, the nominal channel characteristic stored in source 24, for such an ideal channel, is a vector representing a single impulse. The presence of multipath signals in a communications channel results in a channel response characteristic which is not a single impulse. The multipath calculator 20 compares each element in the vector representing the current impulse response to the corresponding element in the vector representing the nominal impulse response. More specifically, the difference between each element in the current impulse response and the corresponding element in the nominal impulse response is first calculated, then the magnitude of each of the differences is calculated, and finally the combination of the magnitudes of the differences is formed as a measure of the strength of the multipath component. This measure of the strength of the multipath component is supplied to the multipath signal strength indicator 40 via output terminal 25.

The inventors have realized, however, that the tap coefficients in the equalizer 10 also represent the current channel response characteristics, although a vector of their values represents the inverse of the vector representing the channel characteristics which would be calculated by a channel estimator 30. Consequently, circuitry already existing in the equalizer 10 may be used to produce a vector representing the channel impulse response.

Figure 2:
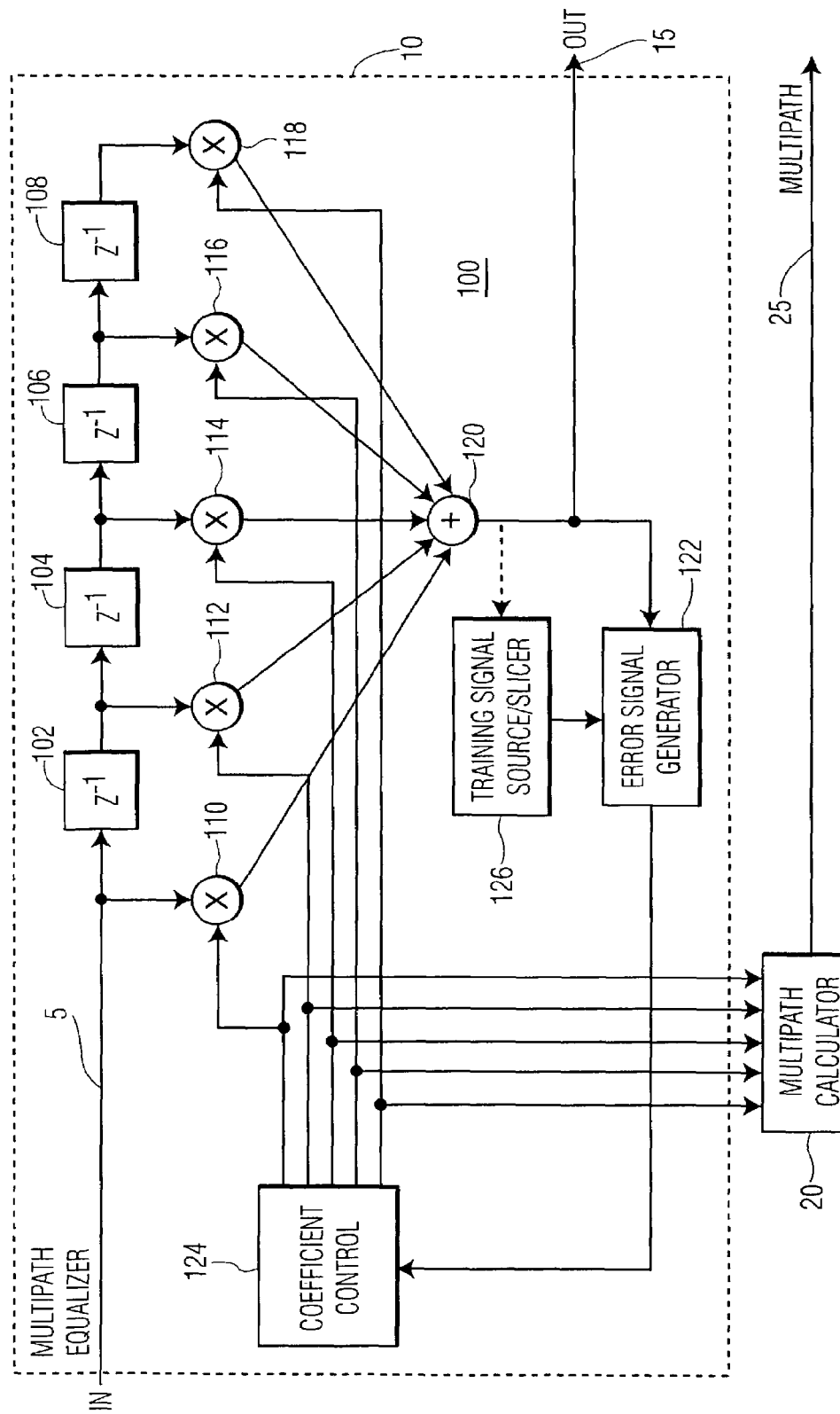
FIG. 2 is a more detailed block diagram of a portion of a communications receiver including an alternate embodiment of a multipath signal strength indicator according to principles of the present invention.

FIG. 2 is a more detailed block diagram of a portion of a communications receiver including an alternate embodiment of a multipath signal strength indicator according to principles of the present invention. Those elements which are the same as those illustrated in FIG. 1 are designated by the same reference number and are not described in detail below. In FIG. 2, an input terminal 5 is coupled to the communications receiver front-end 6. The signal at input terminal 5 is a digital sample stream. The input terminal 5 is coupled to an input terminal of a series connection of delay circuits 102, 104, 106 and 108. Each delay circuit delays the signal at its input terminal by one sample time, and may be clocked by a common clock signal (not shown).

The input terminal 5, and the respective output terminals of the delay circuits 102, 104, 106 and 108, are coupled to respective first input terminals of corresponding coefficient multipliers 110, 112, 114, 116 and 118. Respective output terminals of the coefficient multipliers 110, 112, 114, 116 and 118 are coupled to corresponding input terminals of a signal adder 120. The combination of the delay circuits 102, 104, 106 and 108, coefficient multipliers 110, 112, 114, 116 and 118, and adder 120 form an FIR digital filter 100. As described above, however, the digital filter 100 could also be implemented in the form of an IIR filter, or combination FIR/IIR filter. Although the FIR filter 100 is illustrated in FIG. 2 as including five taps, one skilled in the art will understand that any number of taps may be included.

An output terminal of the signal adder 120 is coupled to an output terminal 15. The output terminal 15 is coupled to the backend 8 (FIG. 1) of the communications receiver. The output terminal of the signal adder 120 is also coupled to a first input terminal of an error signal generator 122. An output terminal of the error signal generator 122 is coupled to an input terminal of a coefficient controller 124. Respective output terminals of the coefficient controller 124 are coupled to corresponding second input terminals of the coefficient multipliers 110, 112, 114, 116 and 118.

A training signal source or slicer 126 is coupled to a second input terminal of the error signal generator. In general, only one of these two functions is implemented in a communications receiver. If equalization is based on receiving a training signal and comparing it to an ideal version of such a received training signal, then element 126 operates as a training signal source. If equalization is decision-based, then element 126 operates as a slicer and has an input terminal coupled to the output terminal of the signal adder 120, illustrated in phantom in FIG. 2. The combination of the FIR filter 100, the error signal generator 122, the training signal source/slicer 126 and the coefficient controller 124 form a multipath equalizer 10.

The respective output terminals of the coefficient controller 124 are further coupled to corresponding input terminals of the multipath calculator 20. The output terminal of the multipath calculator 20 is coupled to the output terminal 25 and produces a signal representing the strength of the multipath component received at the antenna of the communications receiver in a manner to be described in more detail below.

In operation, the FIR filter 100 operates to minimize multipath signal components in a known manner. The error signal generator 122 compares the filtered received signal to an ideal signal to generate an error signal. As described above, the ideal signal is derived in the training signal source/slicer 126 either on a sample-by-sample basis from the sliced received signal, or as a sequence of samples from a predetermined training signal. This error signal represents the difference between the received signal and what the received signal should be. The difference is assumed to be due to multipath distortion. The error signal is analyzed by the coefficient controller 124 which updates the values of the coefficients in response. The coefficient controller 124 operates to adjust the coefficient values so that the error signal is maintained at a minimum level, all in a known manner.

For an equalizer 10 operating in the time domain, if no multipath signal were present, the coefficient for the center tap (multiplier 114) would nominally be a predetermined non-zero value, e.g. 1, and the coefficients for the other taps (multipliers 110, 112, 116 and 118) would be zero. For an equalizer 10 operating in the frequency domain, the coefficients would have values representing the nominal impulse response of the channel. In either case, deviation of the actual coefficients from those nominal values represents the presence of multipath distortion. The multipath calculator 20 compares the current coefficient values to the nominal values and produces a signal representing the degree of multipath distortion detected in the received signal, in a manner to be described in more detail below.

Figure 3:
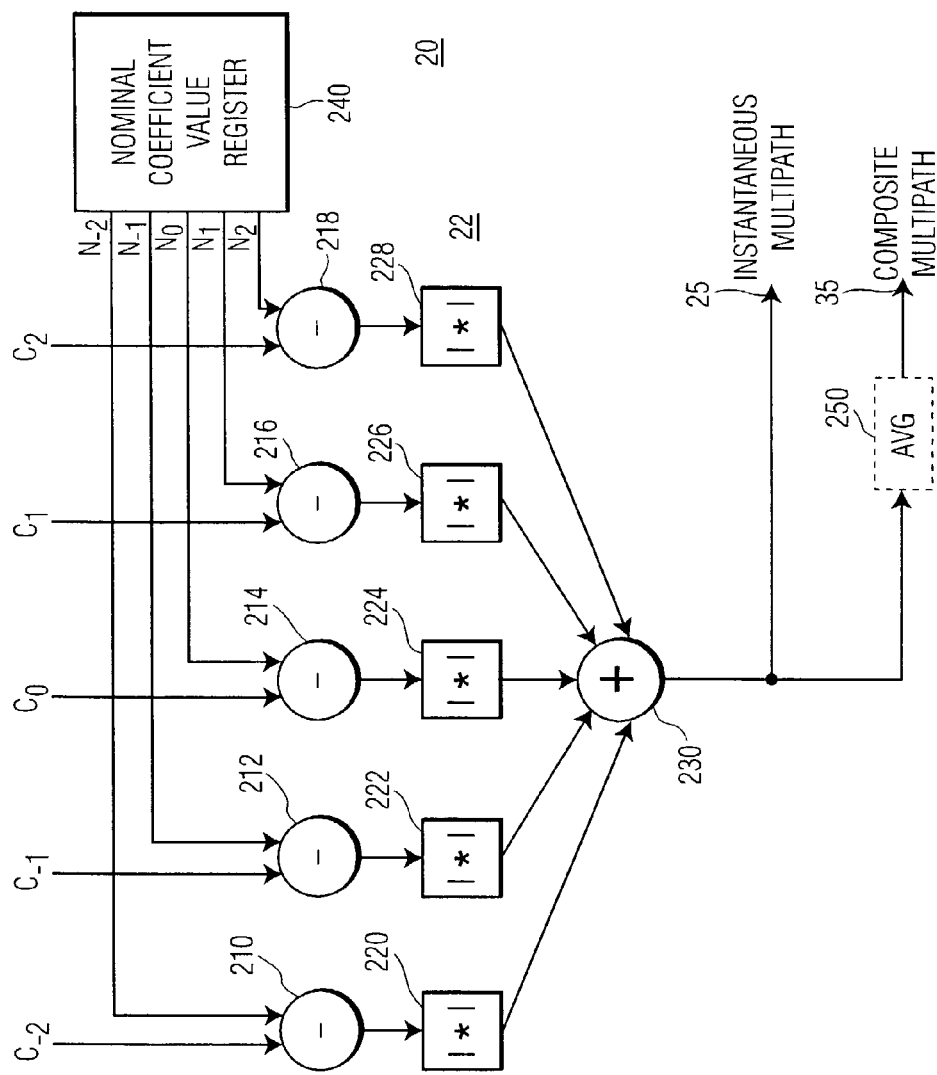
FIG. 3 is a block diagram of a multipath calculator which may be used in the system illustrated in FIG. 2.

FIG. 3 is a block diagram of a multipath calculator 20 which may be used in the system illustrated in FIG. 2. In FIG. 3, respective coefficient input terminals, designated as $C_{-2}$, $C_{-1}$, $C_0$, $C_1$, and $C_2$, are coupled to receive the vector formed by the five coefficients supplied to coefficient multipliers 110, 112, 114, 116 and 118 in FIG. 2, respectively. More specifically, $C_0$ is the coefficient for the center tap of the FIR filter 100.

The coefficient input terminals $C_{-2}$ to $C_2$ are coupled to respective first input terminals of subtractors 210, 212, 214 216 and 218. A register 240 has had nominal (i.e. no multipath component, as described above) values of the coefficients previously stored in it. Respective output terminals of the register 240 are coupled to corresponding second input terminals of the subtractors 210, 212, 214, 216 and 218. That is, the nominal coefficient $N_{-2}$ is coupled to the second input terminal of the subtractor 210 receiving the current coefficient $C_{-2}$, the nominal coefficient $N_{-1}$ is coupled to the second input terminal of the subtractor 212 receiving the current coefficient $C_{-1}$, and so forth. Respective output terminals of the subtractors 210, 212, 214, 216 and 218 are coupled to corresponding input terminals of absolute value circuits 220, 222, 224, 226 and 228. Respective output terminals of the absolute value circuits 220, 222, 224, 226 and 228 are coupled to corresponding input terminals of an adder 230. An output terminal of the adder 230 generates the multipath representative signal and is coupled to the output terminal 25.

In operation, the subtractors 210, 212, 214, 216 and 218 respectively calculate the difference between each current coefficient $C_{-2}$, $C_{-1}$, $C_0$, $C_1$ and $C_2$, and the nominal value of the corresponding coefficient $N_{-2}$, $N_{-1}$, $N_0$, $N_1$ and $N_2$. The magnitude of each resulting difference represents the strength of the multipath signal at the time location of the corresponding tap. The absolute value circuits 220, 222, 224 226 and 228 calculate the magnitudes, disregarding the sign of the differences. The magnitudes of the differences are summed by the adder 230. This sum represents the instantaneous signal strength of the multipath component of the received signal.

It is further possible to provide a measure of the composite multipath signal strength, static plus dynamic. To provide this function, the output terminal of the adder 230 is coupled to an input terminal of an averaging circuit 250, illustrated in phantom in FIG. 3. An output terminal of the averaging circuit 250 is coupled to the output terminal 35 and produces a signal representing the average of the signal strength of the multipath component, which represents the composite multipath component.

Figure 4:
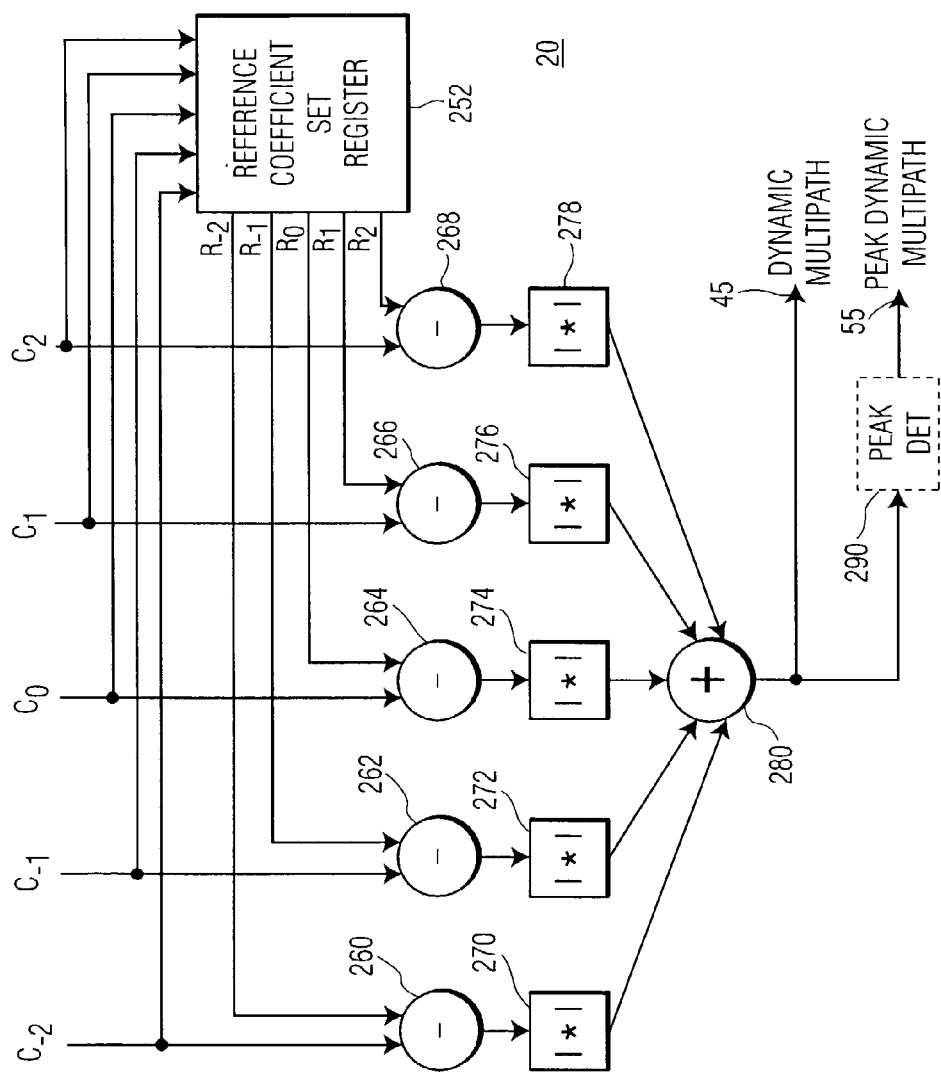
FIG. 4 is a block diagram of further circuitry in the multipath calculator illustrated in FIG. 2 and FIG. 3.

FIG. 4 is a block diagram of further circuitry in the multipath calculator 20 illustrated in FIG. 1 and FIG. 2. Those elements in FIG. 4 which are the same as those illustrated in FIG. 2 and FIG. 3 are designated by the same reference numbers, and are not discussed in detail below. In FIG. 4, the input terminals $C_{-2}$, $C_{-1}$, $C_0$, $C_{-1}$, and $C_2$ are respectively coupled to corresponding input terminals of a reference coefficient set register 252 and first input terminals of subtractors 260, 262, 264, 266 and 268. Respective output terminals of the reference set register 252 are coupled to corresponding second input terminals of the subtractors 260, 262, 264, 266 and 268. That is, the reference coefficient $R_{-2}$, corresponding to coefficient $C_{-2}$, is coupled to the second input terminal of the subtractor 260 receiving the current coefficient $C_{-2}$; the reference coefficient $R_{-1}$, corresponding to coefficient $C_{-1}$, is coupled to the second input terminal of the subtractor 262 receiving the current coefficient $C_{-1}$; and so forth. Respective output terminals of the subtractors 260, 262, 264, 266 and 268 are coupled to corresponding input terminals of absolute value circuits 270, 272, 274, 276 and 278. Respective output terminals of the absolute value circuits 270, 272, 274, 276 and 278 are coupled to corresponding input terminals of an adder 280. An output terminal of the adder 280 produces a signal representing the dynamic multipath component and is coupled to an output terminal 45.

The dynamic multipath component is represented by the short-term changes in the values of the coefficients $C_{-2}$, $C_{-1}$, $C_0$, $C_{-1}$ and $C_2$. To provide a measure of the dynamic multipath component, a set of coefficients, termed a reference set $R_{-2}$ to $R_2$, is latched into the reference coefficient set register 252. The reference coefficient set, $R_{-2}$ to $R_2$, is then compared to successive coefficient sets, $C_{-2}$ to $C_2$, from the FIR 100 (of FIG. 2). The respective differences between coefficients, $C_{-2}$ to $C_2$, from the FIR 100 and those of the reference set, $R_{-2}$ to $R_2$, are calculated by the subtractors 260, 262, 264, 266 and 268. As described above with reference to FIG. 3, it is the magnitude of these differences which represents the dynamic multipath component at the corresponding time location of the corresponding tap. The absolute value circuits 270, 272, 274, 276 and 278 calculate the magnitude of these differences. The adder 280 sums the magnitudes of the differences to provide the overall dynamic multipath value at output terminal 45.

A more accurate measure of the dynamic multipath component may be calculated by maintaining a peak value of the dynamic multipath component over a predetermined time interval. In FIG. 4, the output terminal of the adder 280 is coupled to an input terminal of a peak detector 290, illustrated in phantom in FIG. 4. An output terminal of the peak detector 290 generates a signal representing the peak value of the dynamic multipath component and is coupled to an output terminal 55. This peak value will be more accurately correlated to the dynamic multipath component.

At the end of each predetermined time interval, the value in the peak detector 290 is reset. The length of the predetermined time interval may be adjusted to produce a lower bound on the rate of change of the Doppler multipath signal which may be detected.

It is also possible to regularly latch a new set of reference coefficient values, $R_{-2}$ to $R_2$, into the reference coefficient set register 252. For example, it is possible to latch a new set of reference coefficient values into the reference coefficient set register 252 each time the peak detector 290 is reset, or after some fixed or variable number of reset time intervals. Alternatively, resetting the peak detector 290 and relatching a new reference set of coefficients in the reference coefficient set register 252 may be performed completely independently of each other.

Any of the multipath component representative signals, at output terminals 25, 35, 45 and/or 55, may be coupled to corresponding signal strength indicators (e.g. 40 of FIG. 1) of any known form. For example, they may be connected to an analog meter, to a digital read-out, or to a video display. The video display may be in the form of an analog meter or digital read-out, or may be in any other known signal value indicator, such as a vertical or horizontal bar indicator. Further visual indications may be provided, such as changing the brightness and/or color of the display in response to different ranges of multipath component signal strength. Furthermore, other indications may be provided, such as an audible indication of signal strength, by, for example, changing the volume and/or frequency of the audio signal in response to different ranges of multipath component signal strength. These, or any other appropriate indication of signal strength may be provided to the user. These indications can aid a user in aiming an antenna more accurately, as described above.

One skilled in the art will notice the similarities between the circuitry illustrated in FIG. 3 and that in FIG. 4. The skilled practitioner will understand that the circuit diagrams are illustrative and explanatory only and are not necessarily indicative of the arrangement of actual circuitry. For example, it is possible to share the same subtractors, absolute value circuits and adder in the circuits illustrated in FIG. 3 and FIG. 4. In such an arrangement, multiplexers may be coupled between the nominal coefficient value register 240 and the reference coefficient set register 252 and the shared subtractors. These multiplexers may be controlled in a known manner to dynamically reconfigure the circuit between the arrangement illustrated in FIG. 3 and the arrangement illustrated in FIG. 4. Latches coupled to the output terminals 25, 35, 45 and 55 may be similarly controlled, in a known manner, to latch their input values when the circuit is configured in the appropriate manner. One skilled in the art will further understand that the illustrated circuitry may be implemented completely within a processor operating under control of a control program to perform the calculations described above and present the results to a user.

What is claimed is:

1. In a communications receiver responsive to a communications channel subject to a multipath signal of varying strength, circuitry for a multipath signal strength indicator comprising:
    circuitry for estimating the characteristics of the communications channel;
    circuitry for storing nominal characteristics of the communications channel free of the multipath, signal; and
    circuitry for calculating the difference between the nominal characteristics and the estimated channel characteristics to form a measure and provide an indication of strength of the multipath signal.

2. In a communications receiver, including a multipath equalizer having an adaptive digital filter including a source of tap coefficients, circuitry for a multipath signal strength indicator comprising:
    a source of reference coefficient values, respectively corresponding to the source of tap coefficients representative of a received signal free of a multipath signal; and
    circuitry for calculating the combined magnitudes of the respective differences between the values of the reference coefficients and the corresponding tap coefficients to form a measure and provide an indication of dynamic strength of the multipath signal.

3. The circuitry for the multipath signal strength indicator of claim 2 wherein the calculating circuitry comprises circuitry for generating the differences between the reference coefficients and the tap coefficients.

4. The circuitry for the multipath signal strength of indicator of claim 3 wherein the differences generating circuitry comprises a plurality of subtractors coupled to the source of tap coefficients and the source of reference coefficient values.

5. The circuitry for the multipath signal strength indicator of claim 3 wherein the calculating circuitry further comprises circuitry for calculating the respective magnitudes of the differences between the values of the reference coefficients and the tap coefficients.

6. The circuitry for the multipath signal strength indicator of claim 5 wherein the magnitudes calculating circuitry comprises a plurality of absolute value circuits coupled to the differences generating circuitry.

7. The circuitry for the multipath signal strength indicator of claim 5 wherein the calculating circuitry further comprises circuitry for combining the magnitudes of the differences between the values of the reference coefficients and the tap coefficients.

8. The circuitry for the multipath signal strength indicator of claim 7 wherein the circuitry for combining comprises an adder coupled to the magnitudes calculating circuitry.

9. The circuitry for the multipath signal strength indicator of claim 2 wherein:
the source of reference coefficient values comprises a register in which reference coefficient values have been previously stored; and
the calculating circuitry comprises:
a plurality of subtractors, coupled to the source of tap coefficients and the source of reference coefficient values, each subtractor corresponding to a respective one of the tap coefficients, and having a first input terminal responsive to the corresponding tap coefficient, a second input terminal responsive to a corresponding reference coefficient value, and an output terminal generating the difference between the corresponding reference coefficient value and tap coefficient;
a plurality of absolute value circuits, respectively coupled to the output terminals of corresponding ones of the plurality of subtractors, each generating the magnitude of the corresponding difference; and
an adder, having a plurality of input terminals respectively coupled to the absolute value circuits, for combining the magnitudes of the differences to generate a signal representing the dynamic strength of the multipath signal.

10. The circuitry for the multipath signal strength indicator of claim 9 wherein the calculating circuitry further comprises a peak detector coupled to the adder, for maintaining the peak of the combined magnitudes of the differences to generate a signal representing peak dynamic strength of the multipath signal.

11. The circuitry for the multipath signal strength indicator of claim 2 wherein:
a nominal coefficient register, coupled to the source of tap coefficients, for latching a set of nominal coefficients respectively corresponding to the tap coefficients; and
the calculating circuitry comprises:
a plurality of subtractors, coupled to the source of tap coefficients and the nominal coefficient register, each subtractor corresponding to a respective one of the tap coefficients, and having a first input terminal responsive to the corresponding tap coefficient, a second input terminal responsive to the corresponding nominal coefficient, and an output terminal generating the difference between the corresponding nominal coefficient and tap coefficient;
a plurality of absolute value circuits, respectively coupled to the output terminals of corresponding ones of the plurality of subtractors, each generating the magnitude of the corresponding difference; and
an adder, having a plurality of input terminals respectively coupled to the absolute value circuits, for combining the magnitudes of the differences to generate a signal representing instantaneous strength of the multipath signal.

12. The circuitry for the multipath signal strength indicator of claim 11 wherein the calculating circuitry further comprises an averaging circuit, couple to the adder, for averaging the combined magnitudes of the differences to generate a signal representing composite strength of the multipath signal.

13. The circuitry for the multipath signal strength indicator of claim 2 wherein the multipath signal strength indicator comprises an indicator for providing an indication of the dynamic strength of the multipath signal to a user.

14. In a communications receiver, including a multipath equalizer having an adaptive digital filter including a source of tap coefficients, a method for generating an indication of the signal strength of a multipath signal comprising the steps of:
retrieving a set of reference coefficient values, respectively corresponding to the source of tap coefficients representative of a received signal free of a multipath signal;
calculating the combined magnitudes of the respective differences between the values of the reference coefficients and the tap coefficients; and
providing the combined magnitudes of the differences to form a measure and provide an indication of dynamic strength of the multipath signal.

15. The method of claim 14 further comprising the step of maintaining the peak of the combined magnitudes of the differences to form a measure provide an indication of peak dynamic strength of the multipath signal.

16. The method of claim 14 further comprising the steps of:
storing a set of tap coefficients as nominal coefficients;
calculating the combined magnitudes of the respective differences between the nominal coefficients and the tap coefficients; and
providing the combined magnitudes of the differences to form a measure and provide an indication of instantaneous strength of the multipath signal.

17. The method of claim 16 further comprising the step of averaging the combined magnitudes of the differences to form a measure and provide an indication of composite strength of the multipath signal.

* * * * *